Oct. 11, 1949.   C. M. ANGEL ET AL   2,484,329
WATER GAUGE
Filed May 14, 1948
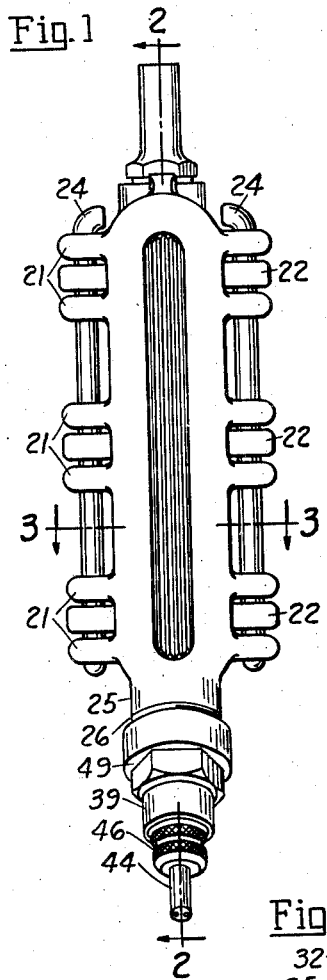
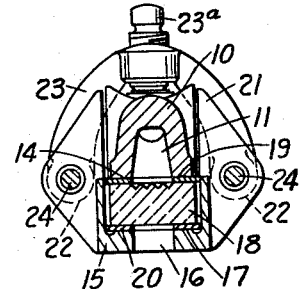
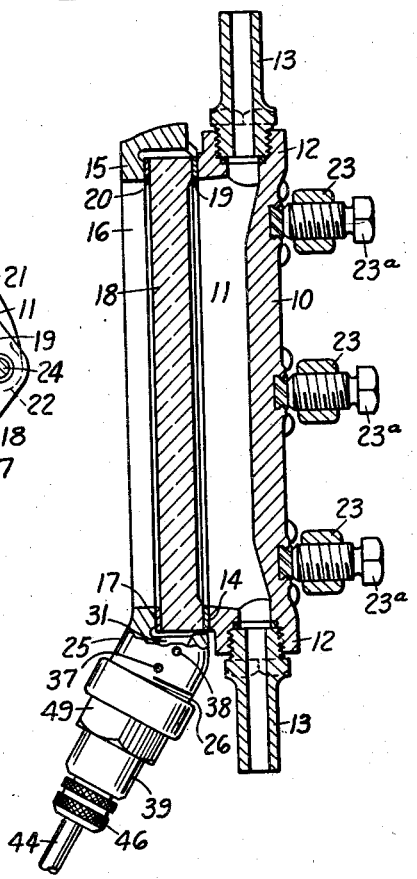
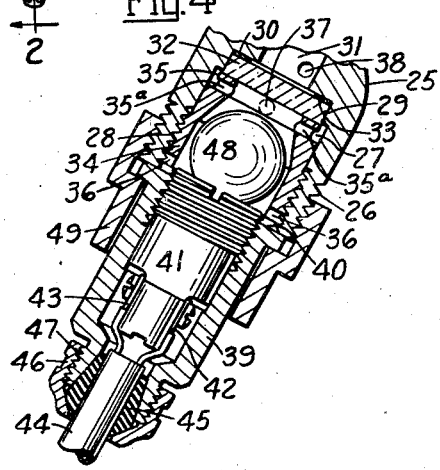
CHARLES M. ANGEL
ROBERT A. CULBERTSON
INVENTORS.
BY Walter E. Wallheim
ATTORNEY.

Patented Oct. 11, 1949

2,484,329

UNITED STATES PATENT OFFICE 2,484,329

WATER GAUGE

Charles M. Angel and Robert A. Culbertson, Huntington, W. Va., assignors to Nathan Manufacturing Company, New York, N. Y., a corporation of New York Application May 14, 1948, Serial No. 27,014

6 Claims. (Cl. 73—293)

This invention refers to water gauges of the kind described in our copending application Serial No. 703,922 which matured into Patent No. 2,450,267 on September 28, 1948 and is a continuation in part thereof.

In these gauges means are provided to introduce light into the gauge structure itself by directing a beam of light lengthwisely and obliquely into the glass whereby the meniscus in the water space behind the glass will be brightly illuminated and objectionable glares and reflections in the front of the glass will be eliminated.

Owing to the fact that the illuminating means are practically an integral part of the gauge structure itself, slight leakages of steam or water between the glass surfaces and the gauge structure proper may cause an electrolytic action to take place around the lamp bulb and socket of the illuminating means resulting in their failure.

It is a particular object of the invention to provide a transparent seal between the illuminating means and the glass whereby any leakages from the gauge are positively prevented from reaching the lamp bulb and socket and whereby, in fact, the rays of light are intensified and better observation of the meniscus made possible.

Another object is to provide a drain port for accumulated leakage in the gauge between the glass and the before mentioned seal.

A further object is to provide simple venting means for the chamber within which the lamp bulb and socket are disposed so as to prevent overheating of this chamber and thus prolong the life of the bulb and socket.

Other objects will become apparent in the following specification and the accompanying drawings in which a preferred embodiment of the invention is shown.

In the drawings,

Fig. 1 is a front view of a gauge embodying the invention;

Fig. 2 is a longitudinal sectional view along the plane of line 2—2 in Fig. 1 with its lower part in elevation;

Fig. 3 is a cross sectional view along the plane of line 3—3 in Fig. 1; and

Fig. 4 is an enlarged fragmentary sectional view of the lower end of the gauge in the plane in which Fig. 2 is shown, illustrating the illuminating, sealing, draining and venting means comprising the invention.

Like characters of reference denote similar parts throughout the several views and the following specification.

10 is a gauge casing of elongated form having a sight opening 11 and ends 12 into which tubular stems 13 are screwed for insertion into the usual type of boiler fittings. Opening 11 is surrounded by a flat face 14. 15 is a front frame of the gauge, also of elongated form and having a sight opening 16 substantially the same as opening 11 in casing 10 and a flat face 17 surrounding opening 16 opposite face 14. 18 is a glass or other transparent member of elongated form somewhat larger than openings 11 and 16 and adapted to be placed between faces 14 and 17. Glass 18 is provided with prismatic corrugations at its inner surface. Gaskets 19 and 20 at faces 14 and 17 enable the glass 18 to make steam and water tight joints therewith.

Frame 15 is provided with pairs of spaced lugs 21 within which are placed ends 22 of yokes 23 and fulcrummed thereon by means of removable rods 24. Each of yokes 23 which straddle the back of casing 10 has a set screw 23a in its center adapted to bear against the casing and thus draw together glass, gaskets, frame and casing making tight joints between them.

So far the gauge described is of a commercial type, well known in the art. We shall now describe our particular improvements to gauges of this or similar type.

The bottom of frame 15 has a short tubular extension 25 disposed at an angle to the longitudinal axis of the glass. The extension is threaded exteriorly at 26 and bored out interiorly at 27 and threaded at 28. A recess 29 is provided for at the end of the bore 27 which also forms a shoulder 30 with a port 31 terminating in the gauge frame 15 at the side of the glass 18. 32 is a transparent disc within the recess 29, and 33 is a gasket between the disc and shoulder 30. A substantially cylindrical bushing 34 is exteriorly threaded to engage the inner threaded portion 28 of the extension. Bushing 34 has a slightly reduced end 35 which bears against the disc 32 and by means of a wrench inserted in screw driver slots 36 at the other end of the bushing forces the disc tightly against the gasket 33 and shoulder 30 making a leak proof joint therewith. The end 35 of bushing 34 is provided with cross ducts 35a which, by virtue of the annular chamber formed between the wall of interior bore 27 and the smaller diameter of end 35, are always in communication with a vent port 37 through the wall of the extension 25. 38 is a drain port transversely through the wall of extension 25 communicating with port 31.

39 is a cylindrical sleeve having a shoulder 40 adapted to contact the outer end of extension 25. 41 is a commercial socket screwed or otherwise secured to the inside of sleeve 39 and carrying the usual electrical wires 42 and 43 encased below the socket in a rubber hose 44. A tapered bushing 45 around the hose 44 is pressed against the hose and the sleeve by a packing nut 46 engaging a threaded end 47 of the sleeve. 48 is a lamp bulb suitably secured to the socket 41. The bulb is disposed within the bushing 34. The entire sleeve assembly is coupled onto the extension by means of a nut 49 which engages the outer threaded portion of the extension and holds shoulder 40 of the sleeve against its end.

Upon switching on the light, the rays from the bulb are projected through the port 31, obliquely through the glass by way of its side, into the space in back of the glass to illuminate brightly the meniscus of the liquid in the gauge so as to make it appear as a very bright line to an observer in front of the gauge. The rays of the light being projected directly into the glass, there is no objectionable glare, nor are reflections present on the outer surface of the glass.

The disc 32 effectively prevents any leakage of water or steam which may take place between face 14 of the gauge, gasket 19 and glass 18 from reaching the lamp bulb and socket and thus eliminates electrolytic action between these parts resulting in failure. To prevent water or condensate to accumulate above the disc, port 38 is provided to drain off such accumulation in port 31. It has further been found that a transparent disc, interposed between the illuminating means and the gauge, increases the intensity of the light and thereby the visibility of the meniscus.

The cross ducts 35a which are so disposed as always to be in communication with the vent port 37 through the wall of the extension 25 insure thorough ventilation of the chamber within which the bulb 48 is located.

It is obvious that other commercial types of sockets and bulbs may be substituted for the one shown in the drawings.

Many other changes in the form, proportion of parts and minor details of construction may be resorted to without departing from the principles or sacrificing any of the advantages of the invention as defined in the appended claims.

What we claim as new, is:

1. In a gauge having a casing with an elongated sight opening, a frame with an elongated sight opening, an elongated flat glass between the casing and frame, and means to hold the casing, frame and glass together; an extension at an end of the frame, a sleeve coupled thereto, a lamp socket and an electric lamp bulb attached to the sleeve, the extension having a port in communication with a side of the glass only and directing the rays from the bulb through the side of the glass against the meniscus of a liquid in the gauge, a transparent disc closing the port ahead of the bulb, and means within the extension holding the disc in place, whereby leakage past the glass is prevented from coming in contact with the socket and bulb.

2. In a gauge as defined in claim 1, the means holding the disc in place comprising a cylindrical bushing engaging the extension and surrounding the bulb.

3. In a gauge as defined in claim 1, the extension having a drain opening between the glass and the disc.

4. In a gauge as defined in claim 1, the extension having a drain opening between the glass and the disc, and a vent opening between the disc and the bulb.

5. In a gauge as defined in claim 1, the means holding the disc in place comprising a cylindrical bushing engaging the extension and surrounding the bulb, the extension and bushing having communicating ports for vent purposes.

6. In a gauge as defined in claim 1, the extension having a drain opening between the glass and the disc, the means holding the disc in place comprising a cylindrical bushing engaging the extension and surrounding the bulb, the extension and bushing having communicating ports for vent purposes.

CHARLES M. ANGEL.
ROBERT A. CULBERTSON.

No references cited.